(12) United States Patent
Williams et al.

(10) Patent No.: US 7,666,303 B2
(45) Date of Patent: Feb. 23, 2010

(54) SEPERATOR TANK

(75) Inventors: Gregory Richard Williams, London (CA); Daniel F. Nason, Holden, MA (US); George E. Hecker, Wayland, MA (US); Mahadevan Padmanabhan, Shrewsbury, MA (US); James T. Mailloux, Hubbardston, MA (US); Stuart A. Cain, Jefferson, MA (US)

(73) Assignee: Monteco Ltd., Ontario (CA)

( * ) Notice: Subject to any disclaimer, the term of this patent is extended or adjusted under 35 U.S.C. 154(b) by 99 days.

(21) Appl. No.: 11/942,049

(22) Filed: Nov. 19, 2007

(65) Prior Publication Data
US 2009/0020466 A1    Jan. 22, 2009

Related U.S. Application Data

(60) Provisional application No. 60/950,996, filed on Jul. 20, 2007.

(51) Int. Cl.
*B01D 21/02* (2006.01)
(52) U.S. Cl. .................. 210/170.03; 210/519; 210/521; 210/532.1; 210/538
(58) Field of Classification Search ................. 210/154, 210/170.03, 519, 521, 532.1, 538
See application file for complete search history.

(56) References Cited

U.S. PATENT DOCUMENTS

| | | | |
|---|---|---|---|
| 942,907 A | 12/1909 | Huff | |
| 1,237,068 A | 8/1917 | Loeb | |
| 1,844,443 A | 2/1932 | Schmidt | |
| 2,393,498 A | 1/1946 | Miller | |
| 2,689,017 A * | 9/1954 | Schmid | ...................... 210/164 |
| 2,764,545 A | 9/1956 | Primich | |
| 3,221,881 A | 12/1965 | Weiler et al. | |
| 3,258,123 A | 6/1966 | Fontaine | |
| 3,282,436 A | 11/1966 | Maim | |
| 3,374,894 A | 3/1968 | Webster | |
| 3,567,024 A | 3/1971 | McCormick | |
| 3,822,789 A | 7/1974 | Crisafuiii | |
| 3,862,040 A | 1/1975 | Preus et al. | |
| 3,951,810 A | 4/1976 | Crisafulli | |
| 4,127,488 A | 11/1978 | Bell et al. | |
| 4,136,010 A | 1/1979 | Pilie et al. | |

(Continued)

OTHER PUBLICATIONS

International Search Report Dated Nov. 3, 2008 for International Application No. PCT/US08/73311.

*Primary Examiner*—Christopher Upton
(74) *Attorney, Agent, or Firm*—Hunton & Williams LLP

(57) ABSTRACT

A separator tank for separating and trapping contaminants in rainwater and runoff is disclosed. According to one embodiment of the present invention, the separator tank comprises a container having a bottom wall, side wall, and top wall defining an internal chamber; an insert located inside of the internal chamber, the insert comprising a weir defining an intake area between the weir and the side wall; and a round-edged orifice positioned within the intake area; an inlet conduit for introducing an influent liquid into the intake area; wherein the weir is positioned such that the weir induces the influent liquid to flow in a swirling motion within the intake area. According to another embodiment of the present invention an insert for a separator tank is disclosed. The insert includes a weir defining an intake area for receiving an influent liquid; and a round-edged orifice positioned within the intake area.

21 Claims, 11 Drawing Sheets

U.S. PATENT DOCUMENTS

| | | |
|---|---|---|
| 4,163,724 A | 8/1979 | Muller et al. |
| 4,192,751 A | 3/1980 | Henton et al. |
| 4,298,471 A | 11/1981 | Dunkers |
| 4,328,101 A | 5/1982 | Broden |
| 4,363,731 A | 12/1982 | Filippi |
| 4,455,231 A | 6/1984 | Filippi |
| 4,578,188 A | 3/1986 | Cousino |
| 4,693,821 A | 9/1987 | Goronszy et al. |
| 4,722,800 A * | 2/1988 | Aymong ................... 210/519 |
| 4,983,294 A | 1/1991 | Lamb |
| 4,985,148 A | 1/1991 | Monteith |
| 5,433,845 A | 7/1995 | Greene et al. |
| 5,498,331 A | 3/1996 | Monteith |
| 5,531,888 A | 7/1996 | Geiger et al. |
| 5,560,826 A | 10/1996 | Szereday et al. |
| 5,725,760 A | 3/1998 | Monteith |
| 5,746,911 A | 5/1998 | Pank |
| 5,746,912 A | 5/1998 | Monteith |
| 5,753,115 A | 5/1998 | Monteith |
| 5,849,181 A * | 12/1998 | Monteith ............... 210/170.03 |
| 5,992,641 A | 11/1999 | Caldwell, Jr. |
| 6,062,767 A * | 5/2000 | Kizhnerman et al. ..... 210/532.1 |
| 6,068,765 A | 5/2000 | Monteith |
| 6,183,633 B1 | 2/2001 | Phillips |
| 6,371,690 B1 | 4/2002 | Monteith |
| 6,428,588 B1 | 8/2002 | Holyoak et al. |
| 6,475,381 B1 * | 11/2002 | Gustafsson ................. 210/519 |
| 6,524,473 B2 * | 2/2003 | Williamson ................. 210/154 |
| 6,547,962 B2 * | 4/2003 | Kistner et al. .......... 210/170.03 |
| 6,849,214 B2 | 2/2005 | Patil |
| 6,866,447 B1 | 3/2005 | Parker |
| 7,182,874 B2 * | 2/2007 | Allard et al. ........... 210/170.03 |
| 7,314,549 B2 * | 1/2008 | Swift ................... 210/170.03 |
| 2003/0141231 A1 * | 7/2003 | Rattenbury et al. ......... 210/163 |

* cited by examiner

SEPERATOR TANK

This application claims priority to provisional application Ser. No. 60/950,996, filed Jul. 20, 2007, entitled, "Separator Tank," the disclosure of which is incorporated herein by reference in its entirety.

BACKGROUND OF THE INVENTION

1. Field of the Invention

This invention generally relates to separator tanks adapted to receive rainwater from a storm sewer or drain, and, more particularly, to separator tanks having a high flow rate through their lower chambers, while achieving high levels of separation and removal efficiency.

2. Description of Related Art

In general, separator tanks are structures adapted to receive rainwater and runoff from a storm sewer or drain. The tanks separate and entrap free and floating oils, grease, hydrocarbon, petroleum products, and total suspended solids (TSS), as well as sorbed contaminants like nutrients, heavy metals, and hydrocarbon and petroleum products, that are transported as suspended solids. Once the various contaminants have been separated or entrapped, the semi-clarified water may be discharged into municipal receiving sewers or water courses. Examples of separator tanks are disclosed in U.S. Pat. Nos. 4,987,148; 5,498,331; 5,725,760; 5,753,115; and 6,068,765, the disclosures of which are incorporated by reference in their entireties.

SUMMARY OF THE INVENTION

A separator tank for separating and trapping contaminants in rainwater and runoff is disclosed. According to one embodiment of the present invention, the separator tank comprises a container having a bottom wall, side wall, and top wall defining an internal chamber; an insert located inside of the internal chamber, the insert comprising a weir defining an intake area between the weir and the side wall; and a round-edged orifice positioned within the intake area; an inlet conduit for introducing an influent liquid into the intake area; wherein the weir is positioned such that the weir induces the influent liquid to flow in a swirling motion within the intake area.

According to another embodiment of the present invention an insert for a separator tank is disclosed. The insert includes a weir defining an intake area for receiving an influent liquid; and a round-edged orifice positioned within the intake area.

According to another embodiment of the present invention, the insert includes a weir defining an intake area for receiving an influent liquid; an orifice positioned within the intake area; and a drop tube in fluid communication with the orifice, the drop tube comprising a base formed by two wings.

According to another embodiment of the present invention, the insert includes a weir defining an intake area for receiving an influent liquid; an orifice positioned within the intake area; and a drop tube in fluid communication with the orifice, the drop tube comprising at least one vertical vane.

According to another embodiment of the present invention, the insert includes a weir defining an intake area for receiving an influent liquid; an orifice positioned within the intake area; and a drop tube in fluid communication with the orifice, the drop tube comprising a base formed by two wings; a back wall; and a front wall.

BRIEF DESCRIPTION OF THE DRAWINGS

For a more complete understanding of the present invention, the objects and advantages thereof, reference is now made to the following descriptions taken in connection with the accompanying drawings.

DETAILED DESCRIPTION OF PREFERRED EMBODIMENTS

Figure 1:
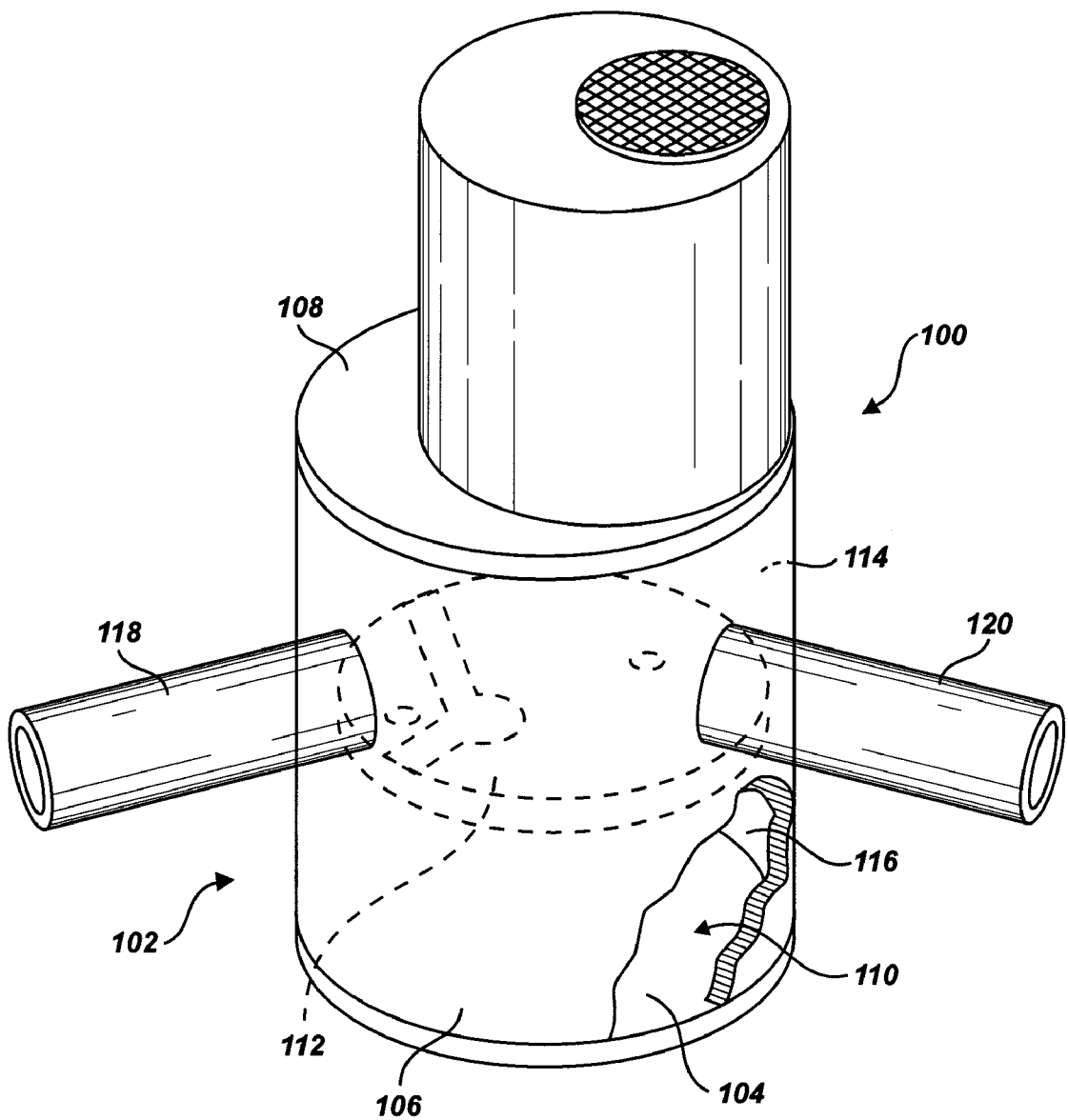
FIG. 1 is a perspective view of a prior art separator tank.

Disclosed embodiments of the present invention and their advantages may be understood by referring to FIGS. 1-11, wherein like reference numerals refer to like elements.

Referring to FIG. 1, a known separator tank, disclosed in U.S. Pat. No. 5,498,331, is illustrated. Separator tank 100 may generally be in the shape of container 102 having bottom wall 104, side wall 106, and top wall 108. Bottom wall 104 and top wall 108 may generally be circular and flat. Side wall 106 may be substantially cylindrical. Bottom wall 104, side wall 106, and top wall 108 may define internal chamber 110. In one embodiment, insert 112 may divide chamber 110 into upper chamber 114 above insert 112, and lower chamber 116 below insert 112.

Figure 2:
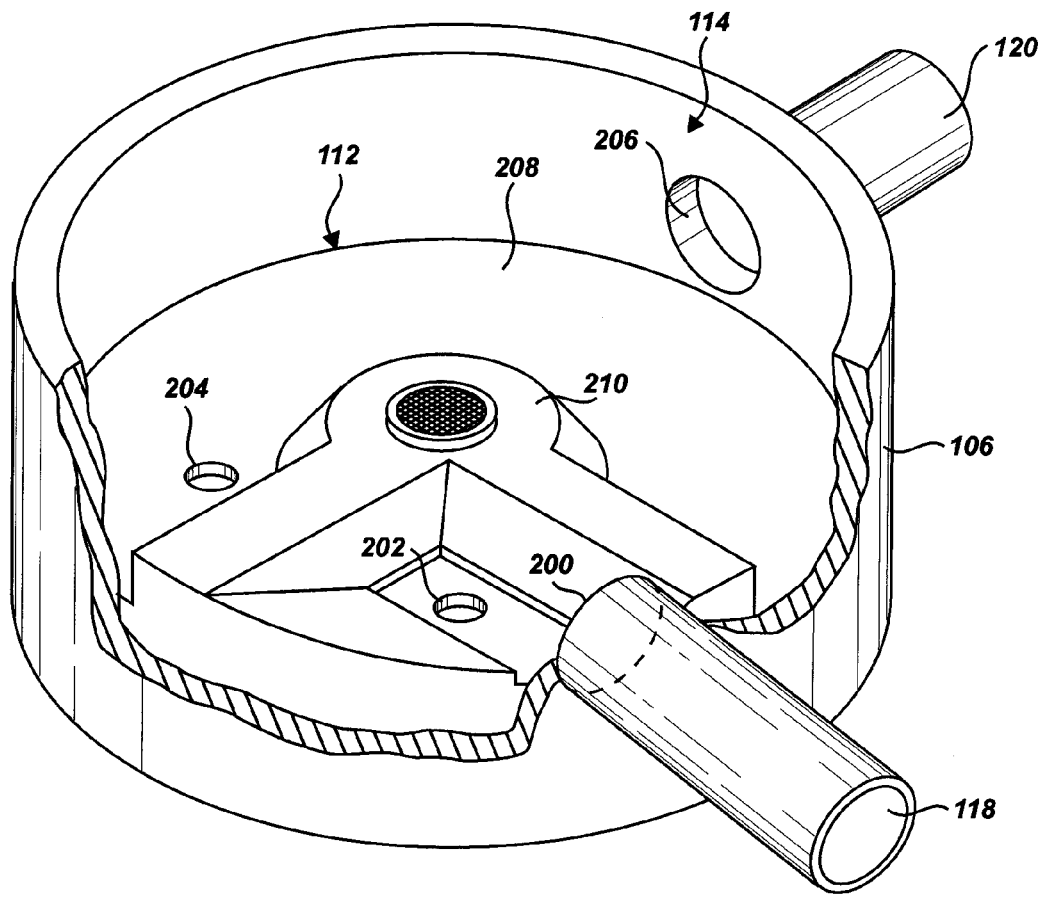
FIG. 2 is a perspective view of the upper chamber of a prior art separator tank.

Referring to FIG. 2, insert 112 has top surface 208. Top surface 208 may generally be said to lie in a single horizontal plane, except for weir 210, which extends above top surface 208. In one embodiment, side wall 106 has inlet opening 200 located adjacently above top surface 208. Side wall 106 may also have outlet opening 206 located adjacently above top surface 208 and spaced peripherally away from inlet opening 200. Conduit 118 may be connected to inlet opening 200 through which liquid may be introduced into the separator tank. Further, conduit 120 may be connected to outlet opening 206. Conduit 120 permits liquid to flow out of the separator tank.

Insert 112 may include a first opening 202. Opening 202 may be disposed between inlet opening 200 and weir 210. A second opening 204 may be on the outlet side of weir 210. Openings 202 and 204 are such that liquid, without having to overflow weir 210, may flow through inlet opening 202 to outlet opening 204. To do so, liquid first flows through inlet opening 202 into the lower chamber 116, through lower chamber 116, and then up through second opening 204 into upper chamber 114.

Figure 3:
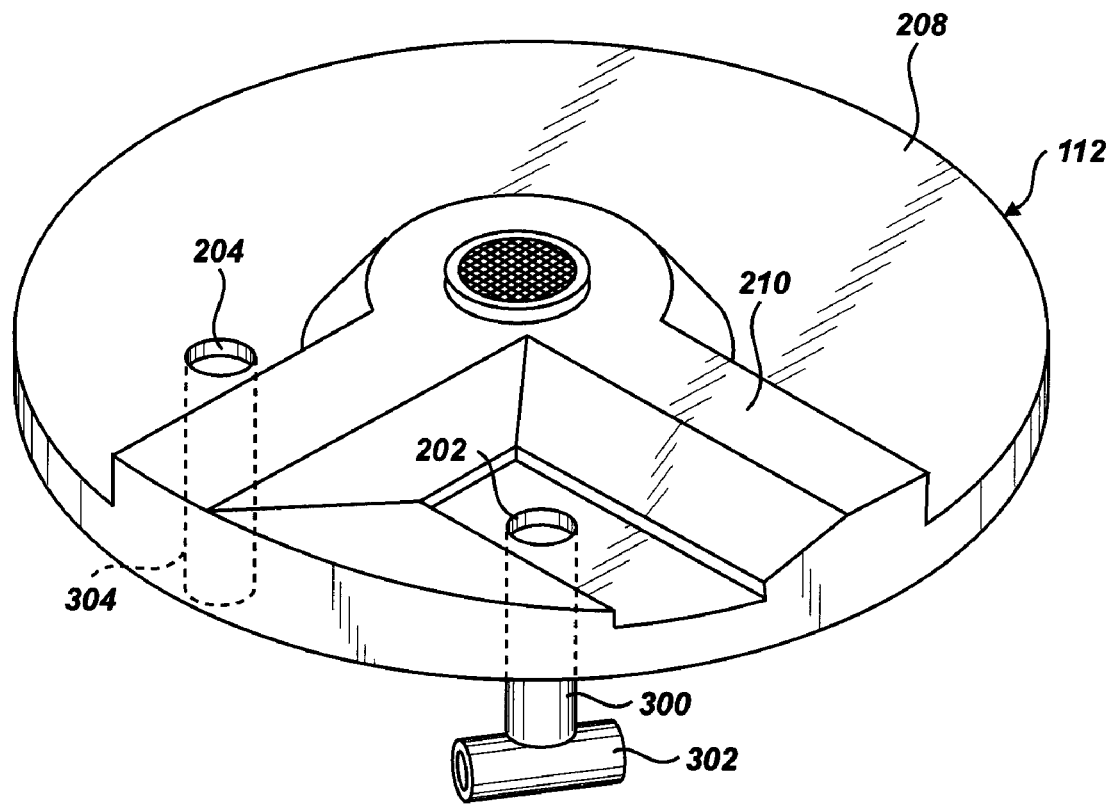
FIG. 3 is a perspective view of an insert for a prior art separator tank.

Referring to FIG. 3, insert 112 may include a drop pipe 300 and a riser pipe 304. Drop pipe 300 may be connected to and extend downwardly from first opening 202. Drop pipe 300 may have T-connection 302. T-connection 302 may allow for distributing the entering liquid in opposite directions within lower chamber 116. Riser pipe 304 may be connected to and extend downwardly from second opening 204. Riser pipe 304 permits water from lower chamber 116 to flow upwardly into upper chamber 114.

Figure 4:
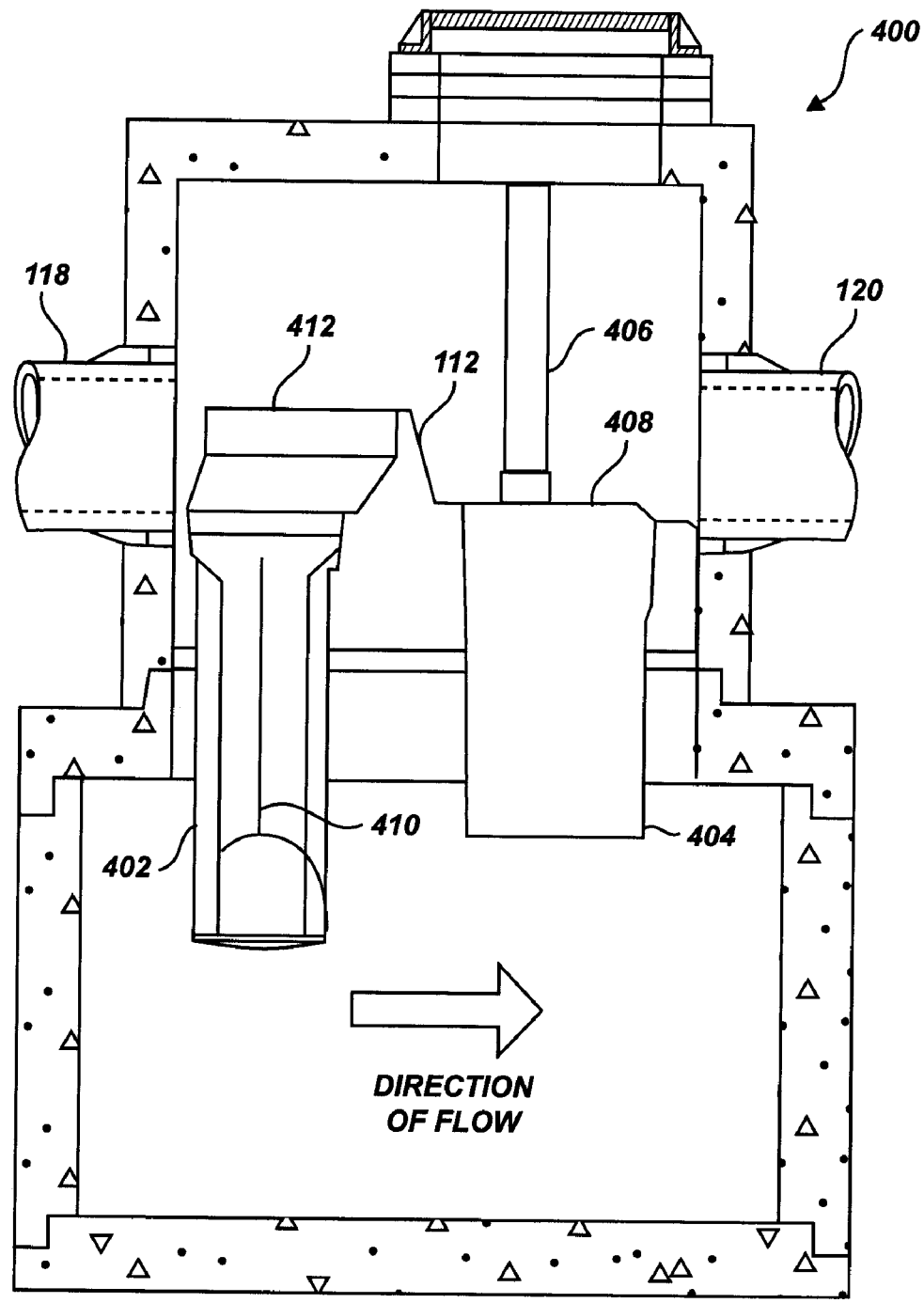
FIG. 4 is a cross-sectional view of a separator tank according to one embodiment of the present invention.
Figure 5:
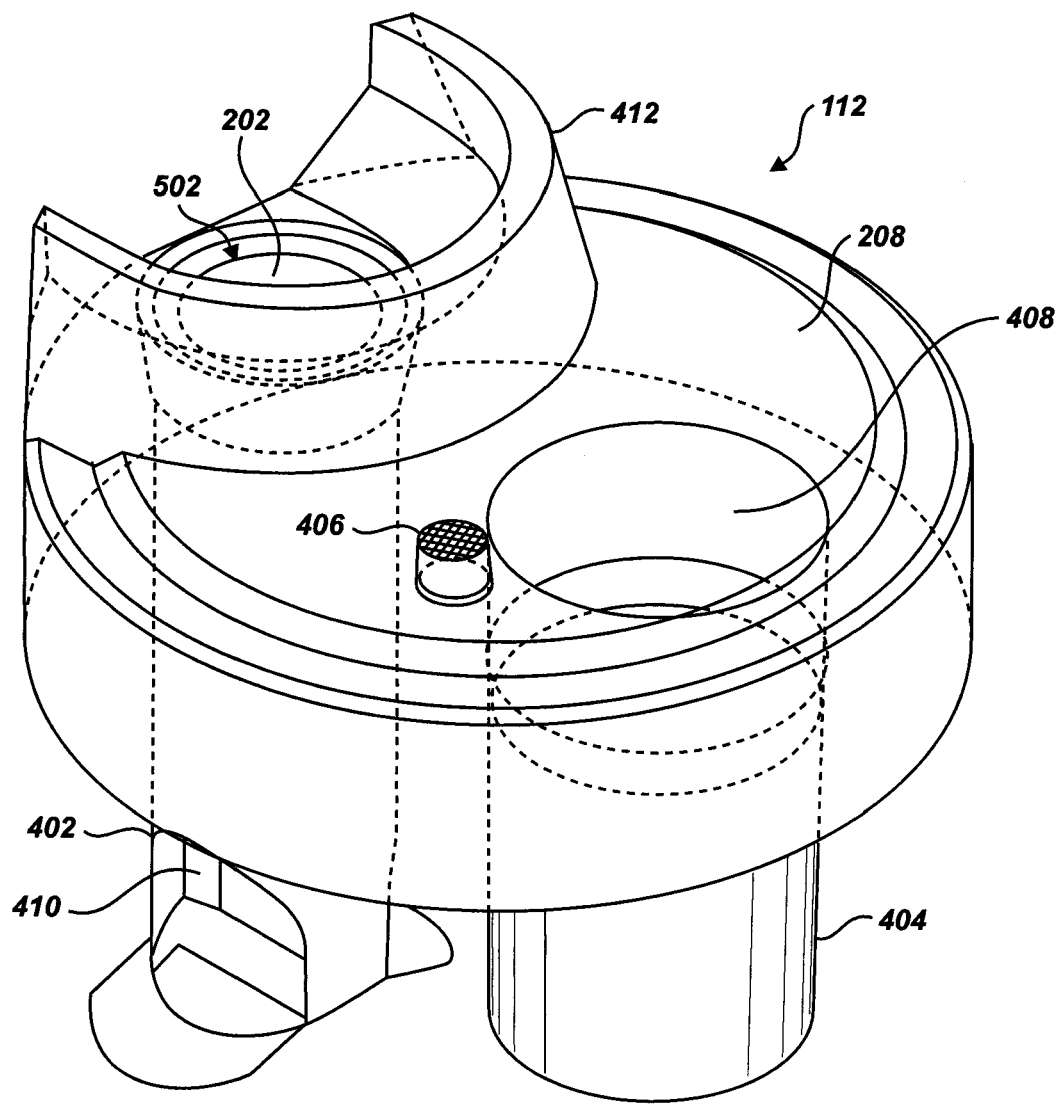
FIG. 5 is a perspective view of the insert for a separator tank according to one embodiment of the present invention.

Referring now to FIGS. 4 and 5, separator tank 400 is shown according to one embodiment of the present invention. In addition to the features described above, in one embodiment, separator tank 400 includes various modifications and enhancements. These modifications and enhancements may include, for example, offsetting the position of insert 112 relative to inlet 118, increasing the height of weir 412, modifying first opening 202 to drop tube 402, providing at least one vertical vane 410 in drop tube 402, modifying the base of drop tube 402, and modifying the back wall of drop tube 402. Each of these modifications may contribute to increasing the treatment flow rate through separator tank 400, while still maintaining high levels of separation and/or removal efficiency. Each modification will be described below.

Referring to FIG. 5, insert 112 is shown according to one embodiment of the present invention. In this embodiment, insert 112 may have a substantially circular outer perimeter, sized to fit within the cylindrical side wall of separator tank 400. Insert 112 may include weir 412, first opening 202, orifice 502, drop pipe 402, riser pipe 404, second opening 408, and vent 406. In another embodiment, one or more of these elements may be provided separately.

Figure 6:
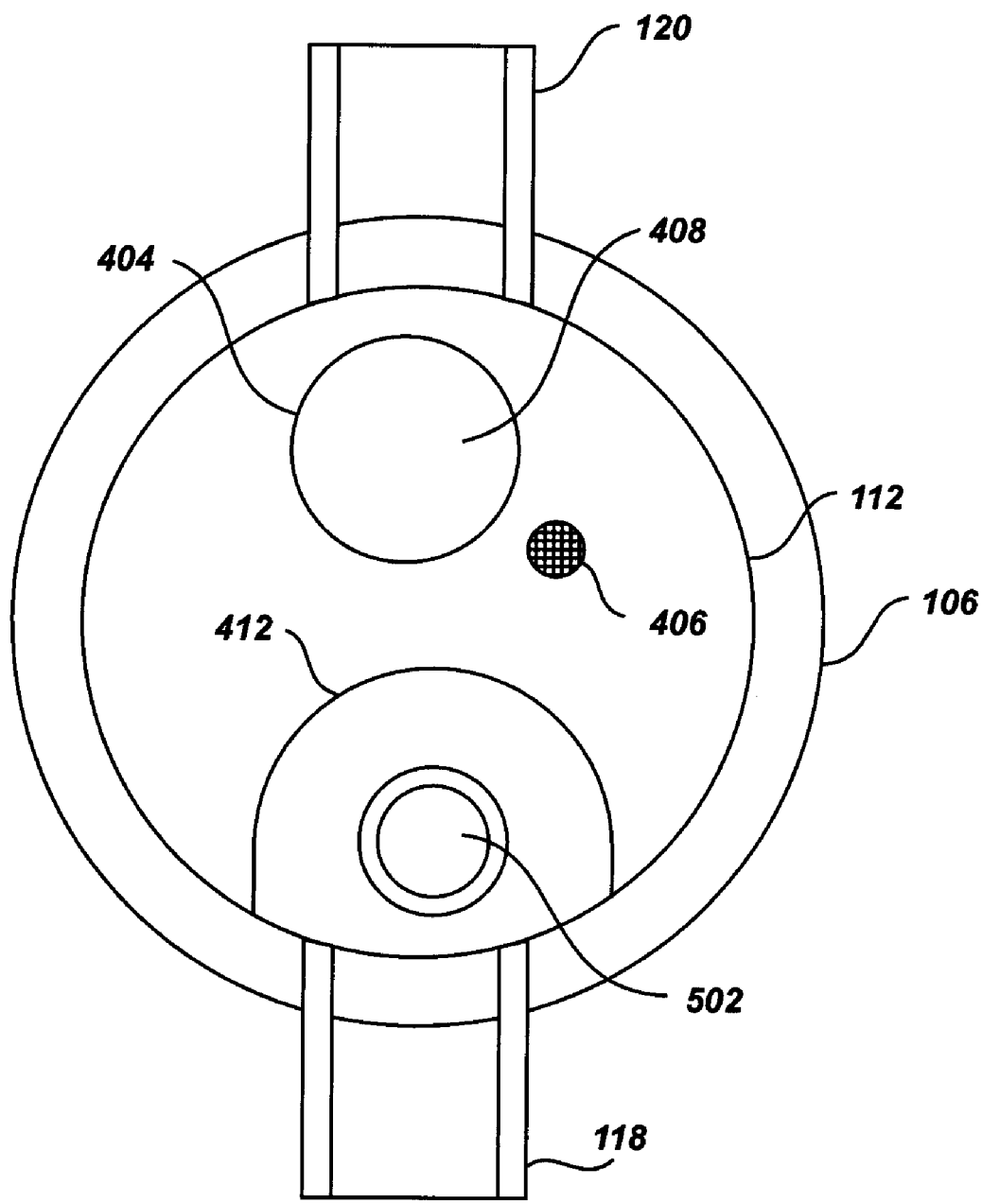
FIG. 6 is a plan view of the insert for a separator tank according to one embodiment of the present invention.

Referring to FIG. 6, insert 112 may be positioned such that weir 412 may be located between inlet 118 on one side of separator tank 400 and outlet 120 on the other side. In one embodiment, weir 412 may define a substantially circular intake area for receiving influent liquid. In another embodiment, weir 412 may define a partially circular or semi-circular intake area. In still another embodiment, weir 412 may define a rectangular intake area. In still another embodiment, weir 412 may define a polygonal intake area. In one embodiment, insert 112 or weir 412 may be positioned such that weir 412 induces the influent liquid to flow in a swirling motion within the intake area. For example, weir 412 may be offset from the center line of inlet 118 to induce swirling. In one embodiment, weir 412 may be offset from the center line of inlet 118 by about 5°, as best shown in FIG. 6. In this embodiment, as influent liquid enters the intake area, the influent liquid may have an angular momentum about orifice 502 causing the influent to swirl and form a controlled vortex. Further, in this embodiment, the influent liquid may form a controlled vortex consistently in the same direction during each flow event, which in turn may allow separator tank 400 to handle increased flow rates. Moreover, the controlled vortex may ensure that all floatables, such as oil, are forced down drop pipe 402. Other degrees of offset or positions for weir 412 may be used as necessary and/or desired.

In another embodiment, inlet 118 may be tangential to separator tank 400, thereby obviating the need to offset insert 112. In this embodiment, the shape of weir 412 may be changed as necessary and/or desired to accommodate a tangential inlet.

In one embodiment, the height of weir 412 may be increased relative to prior art separator weirs. Increasing the height of weir 412 allows for the intake area to handle a greater flow rate. This embodiment leads to an increased pressure gradient, especially during high flow rates, that drives the liquid through separator tank 400. Further, the increased height of weir 412 may allow for greater flow, which in turn may allow for the formation of a stronger and more controlled vortex.

Figure 7A:
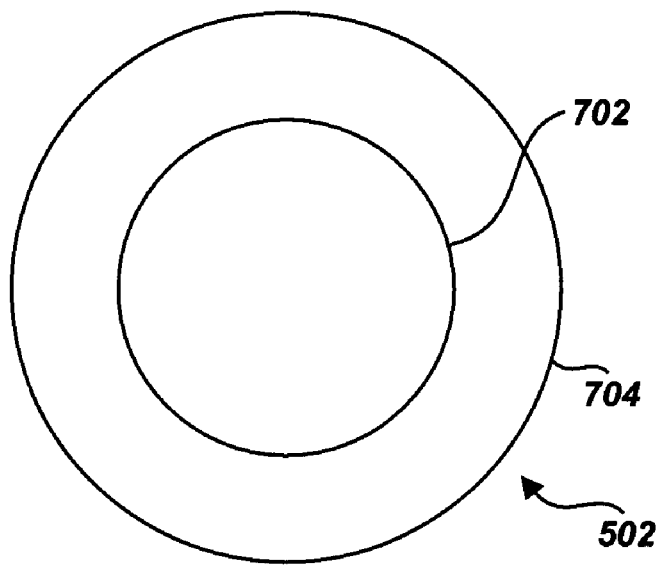
FIG. 7A-7B is a plan and section view of an orifice plate located in the insert according to one embodiment of the present invention.
Figure 7B:
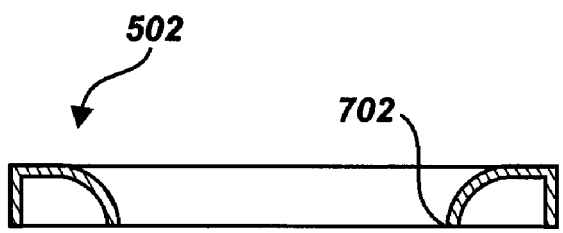
Figure 8:
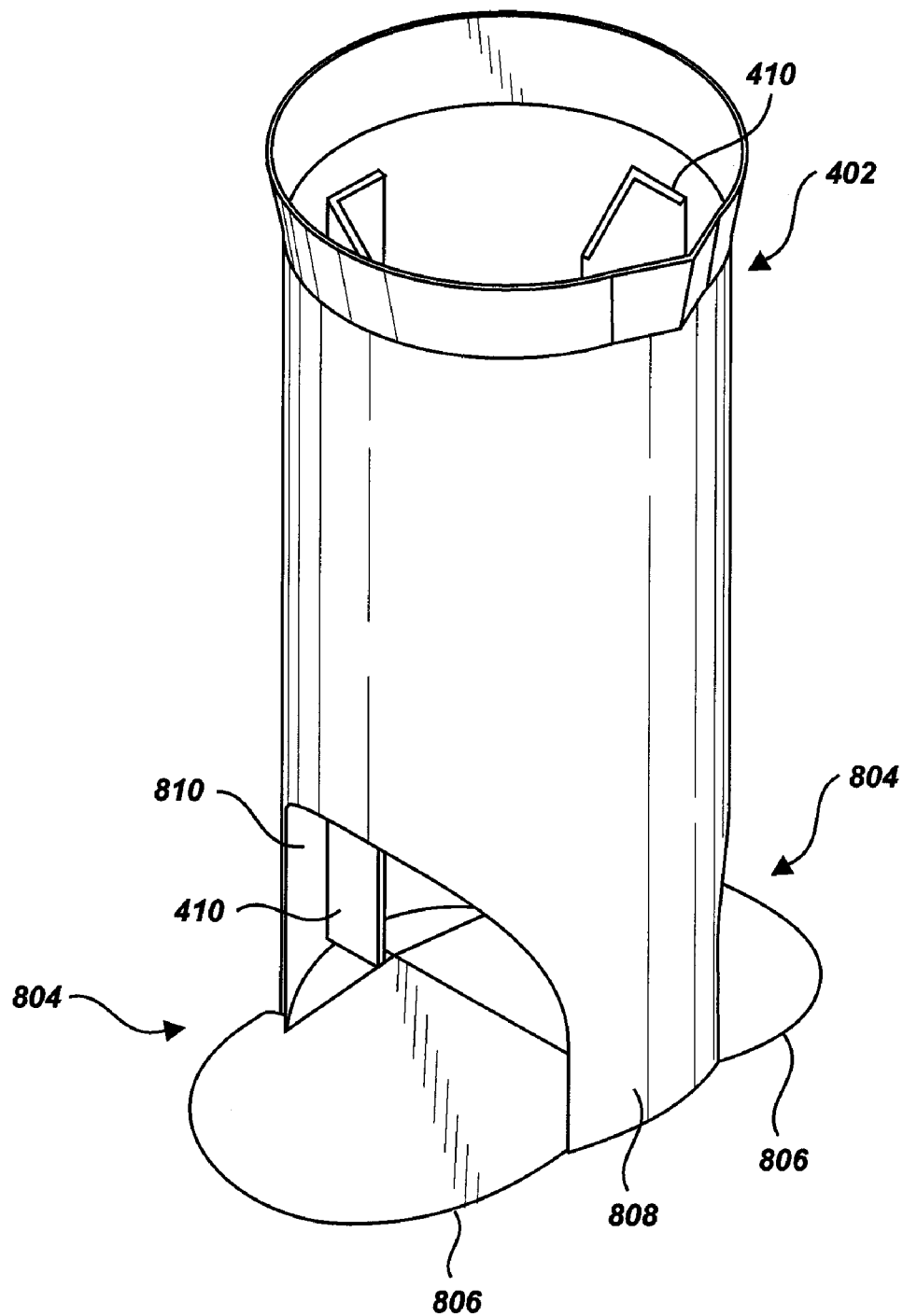
FIG. 8 is a perspective view of the drop tube according to one embodiment of the present invention.

Referring to FIGS. 7A and 7B, orifice 502 is shown according to one embodiment of the present invention. Orifice 502 may be located in the intake area between inlet 118 and weir 412. Orifice 502 may be positioned anywhere within the intake area. In one embodiment, orifice 502 creates first opening 202 through which influent liquid may enter drop pipe 402. In one embodiment, orifice 502 may be modified to have a rounded entrance, as shown in FIG. 7B. Orifice 502 may generally be said to have two diameters: an outside diameter 704 and an inside diameter 702. Outside diameter 704 and inside diameter 702 may be sized appropriately for the environment in which separator tank 400 may be used. Outside diameter 704 may be equivalent to where the rounded edge of orifice 502 aligns with top surface 208 of insert 112. The inside diameter 702 may be equivalent to where the rounded edge of orifice 502 aligns with the inside diameter of drop tube 402. In another embodiment, the diameter of drop tube 402 may be larger than inside diameter 702. The diameters of orifice 502 may be changed as necessary and/or desired.

Rounding the entrance of orifice 502 may increase the treatment flow rate to lower chamber 116. This increase in flow rate may be achieved because rounding the entrance of orifice 502 reduces the pressure drop of the liquid as it flows from above insert 112 into drop pipe 402. Further, rounding the edge of orifice 502 may prevent flow separation and resistance to flow. The radius of the rounded edge may be changed as necessary and/or desired.

Referring to FIGS. 8-11, drop tube 402 is shown according to one embodiment. In this embodiment, drop tube 402 may have a modified base and include at least one vertical vane 410. Drop tube 402 may be integrally formed with insert 112 and extend into the lower chamber 116 of separator tank 400.

Figure 9:
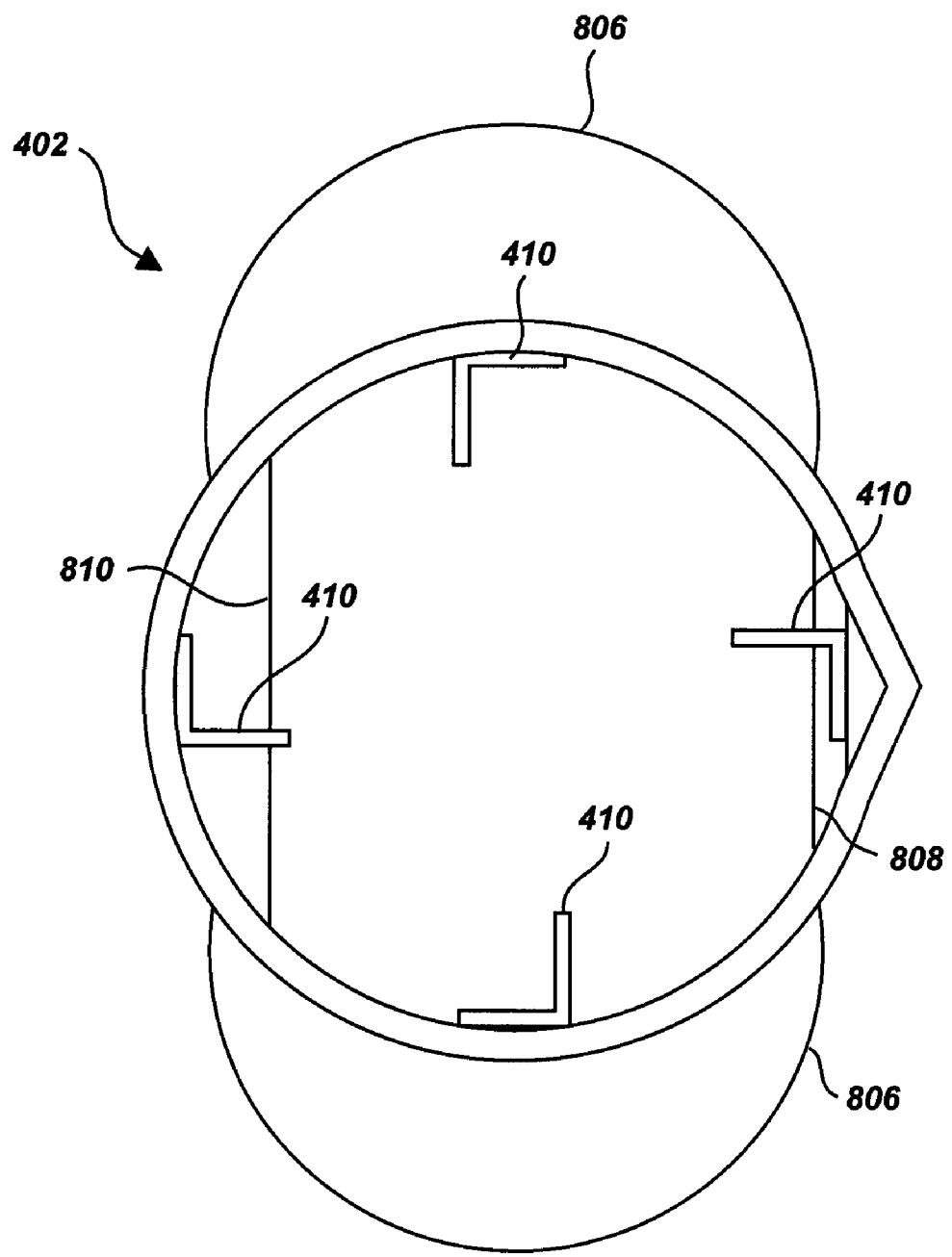
FIG. 9 is a plan view of the drop tube according to one embodiment of the present invention.

As shown in FIG. 9, drop tube 402 may have a plurality of vertical vanes 410 protruding from the inside wall of drop tube 402. Vertical vanes 410 serve to dissipate the vortex that is created in the intake area. As the influent liquid flows downward through drop tube 402, vertical vanes 410 create mini-vortices off the end of each vane 410 that swirl in the opposite direction of the vortex. Thus, vertical vanes 410 dissipate the vortex and may create an equal distribution of flow within drop tube 402. Vertical vanes 410 may also reduce the formation of eddies, which may lead to a more uniform velocity profile through drop tube 402. Reducing the high velocity jets may thereby reduce the chance of re-entraining any contaminates that have already accumulated in lower chamber 116. The shape, size, number, and/or location of vertical vanes 410 may be changed as necessary and/or desired.

Figure 10:
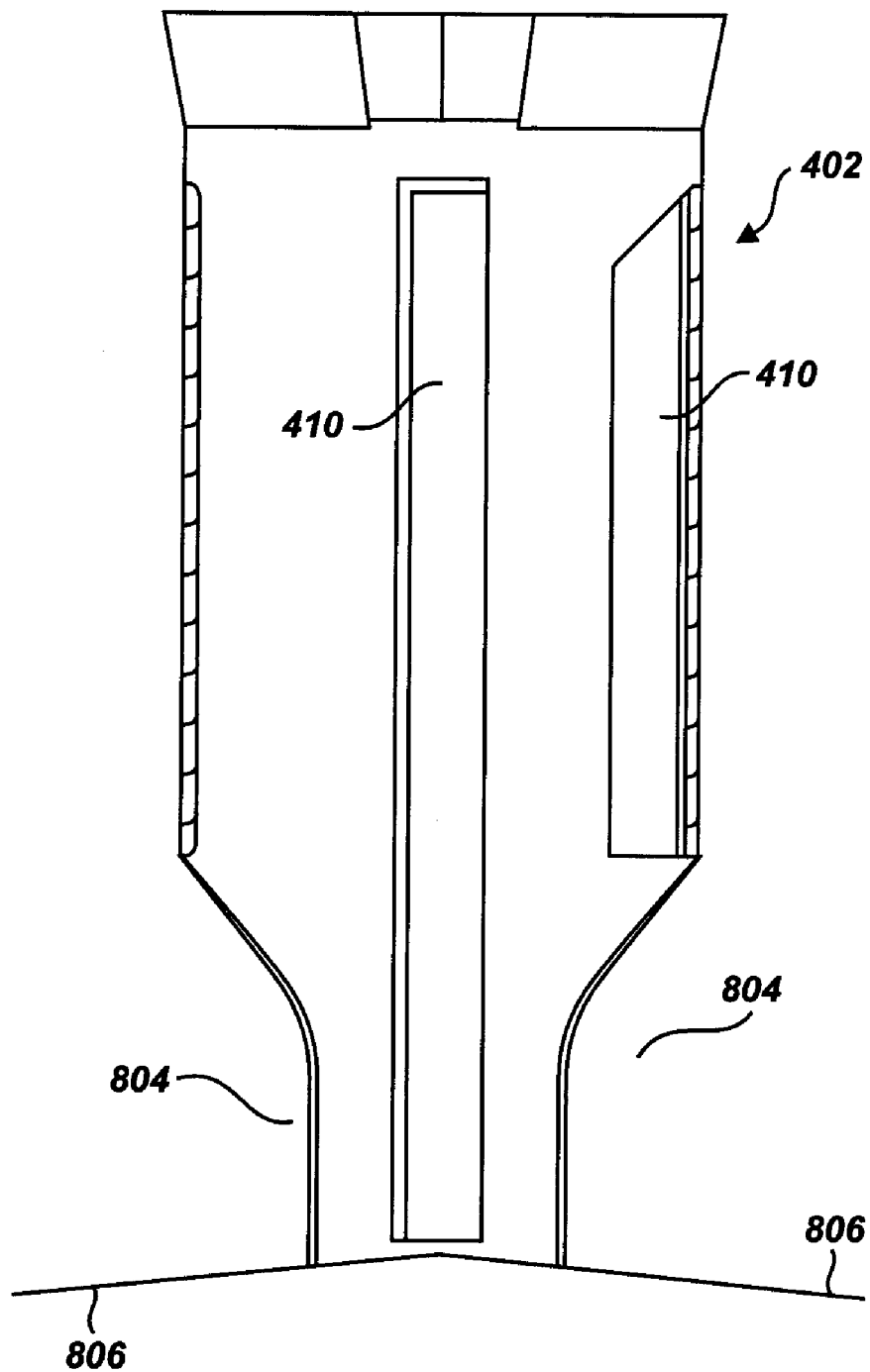
FIG. 10 is a longitudinal cross-section view of the drop tube according to one embodiment of the present invention.

Referring to FIG. 10, drop tube 402 may be modified to terminate at a base that may be comprised of two wings 806. Wings 806 extend outwardly from drop tube 402 and comprise the base for drop tube 402. In one embodiment, wings 806 may extend in opposite directions. Drop tube 402 may have two openings 804 through which liquid exits drop tube 402 and enters lower chamber 116. In one embodiment, wings 806 may be angled slightly downward to prevent solids from accumulated on the base. Wings 806 may also prevent resuspension of contaminants already inside lower chamber 116. In one embodiment, wings 806 direct the flow of the influent liquid into lower chamber 116 in a perpendicular direction to that of the normal direction of flow in lower chamber 116. By introducing the influent liquid into lower chamber 116 in this manner, the residence time of the liquid in lower chamber 116 may be increased, and therefore the liquid may have an increased settling and separation time.

Figure 11:
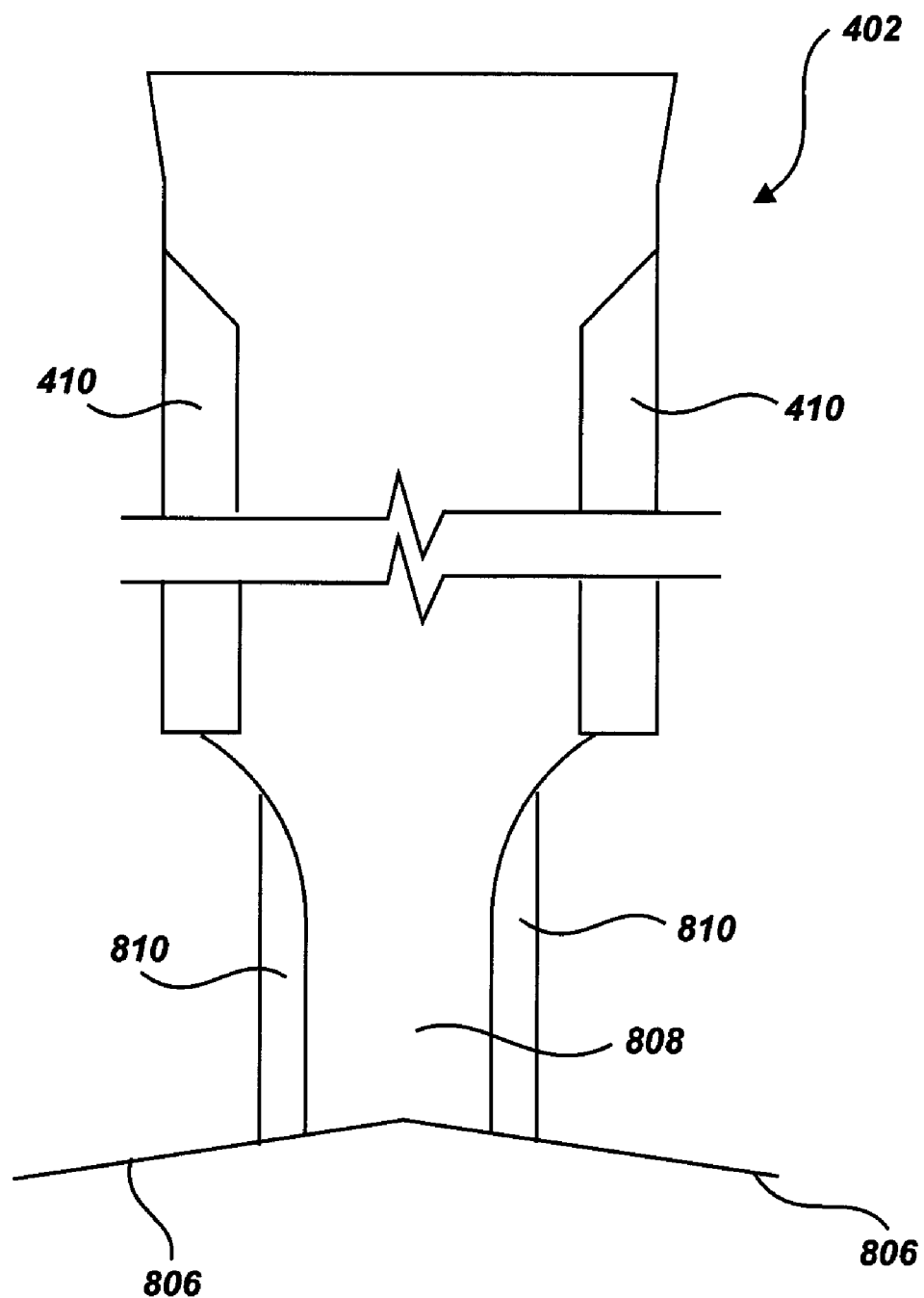
FIG. 11 is a front view of the drop tube according to one embodiment of the present invention.

Referring to FIGS. 10 and 11, drop tube 402 may have back wall 810 and front wall 808. In one embodiment, the arc length of back wall 810 may be greater than the arc length of front wall 808. Modifying back wall 810 may prevent the influent liquid, as it exits drop tube 402, from impinging the nearest separator tank wall, which may be directly behind drop tube 402. In this embodiment, back wall 810 may reduce re-entrainment and excessive turbulence.

The following examples are included to demonstrate preferred embodiments of the claimed subject matter. It should be appreciated by those of skill in the art that the techniques disclosed in the examples which follow represent techniques discovered by the inventors to function well in the practice of the claimed subject matter, and thus can be considered to constitute preferred modes for its practice. However, those of skill in the art should, in light of the present disclosure, appreciate that many changes can be made in the specific embodiments which are disclosed and still obtain a like or similar result without departing from the scope of the claimed subject matter

EXAMPLE

A separator tank with the modifications and enhancements described above was tested to illustrate the capture efficiency of sediment, for five (5) flows, at 100, 200 and 300 mg/L concentration per flow. The tested separator tank consisted of a 6-foot diameter by approximately 6-foot high upper receiving chamber and 8-foot diameter by approximately 6-foot high lower settling chamber. An insert was mounted within the separator tank. The insert incorporated a semi-circular weir, 11-inch orifice plate, 18-inch inlet drop tee, 24-inch vertical outlet riser-pipe and 6-inch oil port. The unit had a 24-inch diameter inlet and outlet pipes, with the inlet invert tangent to the insert floor and inlet to outlet differential of 1-inch. The inlet pipe was oriented with a 1% slope and both pipes are centered within the unit. The modifications and enhancements included offsetting the inlet by 5°, increasing the height of the weir, providing four vertical vanes in the drop tube, providing two wings at the base of the drop tube, and increasing the arc length of the back wall of the drop tube. The hydraulic capacity and sediment removal efficiency was evaluated for the separator tank.

To determine the hydraulic capacity, preliminary flow (gpm) and water level (inches) within the unit were measured for 3 flows ranging from 0 to 1347 gpm (3.0 cfs). The maximum flow attained prior to breaching the bypass weir was 1122 gpm (2.5 cfs). Sediment removal efficiency tests were conducted at five (5) flows ranging from 281 to 1,403 gpm (0.63 to 3.13 cfs) with influent sediment concentrations of 100, 200 and 300 mg/L. The results are detailed below.

During the testing, the sediment concentration in the influent was measured in two ways. First, the sediment concentration was measured directly by placing iso-kinetic samplers in the water stream and a sample was collected. Second, the sediment concentration was measured indirectly by weighing the mass of the sediment metered into the measured flow and a concentration was calculated. Effluent sediment concentration was measure using iso-kinetic samplers in the flow. Removal efficiency was calculated using the direct measurements for influent and effluent. Adjusted removal efficiency was calculated using the indirectly measure influent concentration and the directly measured effluent concentration.

Sediment Removal Efficiencies at 125% Design Flow (1,403 gpm, 3.13 cfs)

1. 300 mg/L

The average flow recorded for the entire test was 1400.7 gpm (3.12 cfs), with a standard deviation (SD) of 2.91. The recorded temperature for the test was 75.4 degrees F. The measured influent sample concentrations ranged from 253.8 mg/L to 349.1 mg/L, with a mean concentration of 284.9 mg/L and SD of 39.8. The effluent concentrations ranged from 162.9 mg/L to 182.6 mg/L, with a mean concentration of 174.1 mg/L and SD of 8.4. The average background concentration was 0.8 mg/L. The resulting sediment removal efficiency for the indirect method was 38.9%. The adjusted influent concentrations ranged from 300.1 mg/L to 311.5 mg/L, with a mean concentration of 304.2 mg/L and SD of 4.5. The corresponding adjusted removal efficiency was 42.8%.

2. 200 mg/L

The average flow recorded for the entire test was 1401.4 gpm (3.12 cfs), with a standard deviation (SD) of 6.4. The recorded temperature for the test was 75.4 degrees F. The measured influent sample concentrations ranged from 177.8 mg/L to 220.0 mg/L, with a mean concentration of 196.3 mg/L and SD of 18.6. The effluent concentrations ranged from 122.1 mg/L to 139.2 mg/L, with a mean concentration of 132.3 mg/L and SD of 7.1. The average background concentration was 5.54 mg/L. The resulting sediment removal efficiency for the indirect method was 32.6%. The adjusted influent concentrations ranged from 199.1 mg/L to 204.0 mg/L, with a mean concentration of 201.8 mg/L and SD of 2.2. The corresponding adjusted removal efficiency was 34.4%.

3. 100 mg/L

The average flow recorded for the entire test was 1401.1 gpm (3.12 cfs), with a standard deviation (SD) of 3.3. The recorded temperature for the test was 75.2 degrees F. The measured influent sample concentrations ranged from 78.3 mg/L to 115.1 mg/L, with a mean concentration of 97.1 mg/L and SD of 16.5. The effluent concentrations ranged from 79.8 mg/L to 88.9 mg/L, with a mean concentration of 84.0 mg/L and SD of 3.3. The average background concentration was 1.96 mg/L. The resulting sediment removal efficiency for the indirect method was 13.5%. The adjusted influent concentrations ranged from 98.1 mg/L to 98.7 mg/L, with a mean concentration of 98.4 mg/L and SD of 0.3. The corresponding adjusted removal efficiency was 14.6%.

Sediment Removal Efficiencies at 100% Design Flow (1,122 gpm, 2.50 cfs)

1. 300 mg/L

The average flow recorded for the entire test was 1122.0 gpm (2.50 cfs), with a standard deviation (SD) of 2.39. The recorded temperature for the test was 76.9 degrees F. The measured influent sample concentrations ranged from 241.5 mg/L to 368.0 mg/L, with a mean concentration of 297.5 mg/L and SD of 51.9. The effluent concentrations ranged from 105.5 mg/L to 132.6 mg/L, with a mean concentration of 120.4 mg/L and SD of 11.3. The average background concentration was negligible. The resulting sediment removal efficiency for the indirect method was 59.5%. The adjusted influent concentrations ranged from 98.5 mg/L to 306.8 mg/L, with a mean concentration of 304.2 mg/L and SD of 3.7. The corresponding adjusted removal efficiency was 60.4%.

2. 200 mg/L

The average flow recorded for the entire test was 1121.6 gpm (2.50 cfs), with a standard deviation (SD) of 3.51. The recorded temperature for the test was 76.7 degrees F. The measured influent sample concentrations ranged from 157.9 mg/L to 253.2 mg/L, with a mean concentration of 190.1 mg/L and SD of 38.2. The effluent concentrations ranged from 72.3 mg/L to 86.9 mg/L, with a mean concentration of 80.4 mg/L and SD of 6.1. The average background concentration was 3.5 mg/L. The resulting sediment removal efficiency for the indirect method was 57.7%. The adjusted influent concentrations ranged from 197.4 mg/L to 203.1 mg/L, with a mean concentration of 201.1 mg/L and SD of 2.3. The corresponding adjusted removal efficiency was 60.0%.

3. 100 mg/L

The average flow recorded for the entire test was 1118.3 gpm (2.49 cfs), with a standard deviation (SD) of 2.6. The recorded temperature for the test was 75.7 degrees F. The measured influent sample concentrations ranged from 100.8 mg/L to 121.8 mg/L, with a mean concentration of 110.3 mg/L and SD of 8.0. The effluent concentrations ranged from 46.8 mg/L to 62.0 mg/L, with a mean concentration of 55.9 mg/L and SD of 7.8. The average background concentration was negligible. The resulting sediment removal efficiency for the indirect method was 49.3%. The adjusted influent concentrations ranged from 98.5 mg/L to 99.4 mg/L, with a mean concentration of 99.0 mg/L and SD of 0.3. The corresponding adjusted removal efficiency was 43.5%.

Sediment Removal Efficiencies at 75% Design Flow (842 gpm, 1.88 cfs)

1. 300 mg/L

The average flow recorded for the entire test was 840.7 gpm (1.87 cfs), with a standard deviation (SD) of 2.2. The recorded temperature for the test was 77.9 degrees F. The measured influent sample concentrations ranged from 406.4 mg/L to 452.3 mg/L, with a mean concentration of 436.8 mg/L and SD of 18.9. The effluent concentrations ranged from 86.5 mg/L to 95.7 mg/L, with a mean concentration of 92.0 mg/L and SD of 3.4. The average background concentration was negligible. The resulting sediment removal efficiency for the indirect method was 78.9%. The adjusted influent concentrations ranged from 305.7 mg/L to 319.2 mg/L, with a mean concentration of 314.9 mg/L and SD of 4.9. The corresponding adjusted removal efficiency was 70.8%.

2. 200 mg/L

The average flow recorded for the entire test was 842.4 gpm (1.88 cfs), with a standard deviation (SD) of 2.2. The recorded temperature for the test was 78.7 degrees F. The measured influent sample concentrations ranged from 256.2 mg/L to 290.4 mg/L, with a mean concentration of 276.4 mg/L and SD of 13.4. The effluent concentrations ranged from 56.7 mg/L to 79.9 mg/L, with a mean concentration of 73.4 mg/L and SD of 9.5. The average background concentration was 1.5 mg/L. The resulting sediment removal efficiency for the indirect method was 73.4%. The adjusted influent concentrations ranged from 198.7 mg/L to 205.5 mg/L, with a mean concentration of 202.8 mg/L and SD of 2.6. The corresponding adjusted removal efficiency was 63.8%.

3. 100 mg/L

The average flow recorded for the entire test was 841.6 gpm (1.88 cfs), with a standard deviation (SD) of 2.03. The recorded temperature for the test was 76.5 degrees F. The measured influent sample concentrations ranged from 85.4 mg/L to 130.2 mg/L, with a mean concentration of 104.4 mg/L and SD of 18.7. The effluent concentrations ranged from 31.5 mg/L to 46.6 mg/L, with a mean concentration of 37.9 mg/L and SD of 6.4. The average background concentration was negligible. The resulting sediment removal efficiency for the indirect method was 63.7%. The adjusted influent concentrations ranged from 98.6 mg/L to 102.6 mg/L, with a mean concentration of 101.6 mg/L and SD of 1.5. The corresponding adjusted removal efficiency was 62.7%.

Sediment Removal Efficiencies at 50% Design Flow (561 gpm, 1.25 cfs)

1. 300 mg/L

The average flow recorded for the entire test was 560.2 gpm (1.25 cfs), with a standard deviation (SD) of 1.0. The recorded temperature for the test was 76.3 degrees F. The measured influent sample concentrations ranged from 287.1 mg/L to 375.5 mg/L, with a mean concentration of 339.6 mg/L and SD of 34.6. The effluent concentrations ranged from 82.8 mg/L to 97.9 mg/L, with a mean concentration of 91.5 mg/L and SD of 6.0. The average background concentration was negligible. The resulting sediment removal efficiency for the indirect method was 73.0%. The adjusted influent concentrations ranged from 298.7 mg/L to 317.0 mg/L, with a mean concentration of 311.7 mg/L and SD of 7.0. The corresponding adjusted removal efficiency was 70.6%.

2. 200 mg/L

The average flow recorded for the entire test was 560.4 gpm (1.25 cfs), with a standard deviation (SD) of 1.2. The recorded temperature for the test was 76.6 degrees F. The measured influent sample concentrations ranged from 200.7 mg/L to 246.2 mg/L, with a mean concentration of 224.7 mg/L and SD of 16.8. The effluent concentrations ranged from 48.6 mg/L to 64.3 mg/L, with a mean concentration of 55.6 mg/L and SD of 7.0. The average background concentration was negligible. The resulting sediment removal efficiency for the indirect method was 75.2%. The adjusted influent concentrations ranged from 196.9 mg/L to 205.3 mg/L, with a mean concentration of 202.7 mg/L and SD of 3.1. The corresponding adjusted removal efficiency was 72.6%.

3. 100 mg/L

The average flow recorded for the entire test was 558.3 gpm (1.24 cfs), with a standard deviation (SD) of 9.0. The recorded temperature for the test was 77.2 degrees F. The measured influent sample concentrations ranged from 100.8 mg/L to 122.4 mg/L, with a mean concentration of 114.8 mg/L and SD of 8.5. The effluent concentrations ranged from 25.9 mg/L to 29.4 mg/L, with a mean concentration of 28.1 mg/L and SD of 1.4. The average background concentration was negligible. The resulting sediment removal efficiency for the indirect method was 75.6%. The adjusted influent concentrations ranged from 100.8 mg/L to 102.5 mg/L, with a mean concentration of 101.5 mg/L and SD of 0.7. The corresponding adjusted removal efficiency was 72.4%.

Sediment Removal Efficiencies at 25% Design Flow (281 gpm, 0.63 cfs)

1. 300 mg/L

The average flow recorded for the entire test was 280.7 gpm (0.63 cfs), with a standard deviation (SD) of 0.4. The recorded temperature for the test was 75.6 degrees F. The measured influent sample concentrations ranged from 318.8 mg/L to 363.0 mg/L, with a mean concentration of 331.2 mg/L and SD of 18.3. The effluent concentrations ranged from 25.6 mg/L to 41.7 mg/L, with a mean concentration of 31.8 mg/L and SD of 7.4. The average background concentration was negligible. The resulting sediment removal efficiency for the indirect method was 90.4%. The adjusted influent concentrations ranged from 286.5 mg/L to 307.3 mg/L, with a mean concentration of 293.3 mg/L and SD of 9.2. The corresponding adjusted removal efficiency was 89.2%.

2. 200 mg/L

The average flow recorded for the entire test was 280.9 gpm (0.63 cfs), with a standard deviation (SD) of 0.4. The recorded temperature for the test was 75.5 degrees F. The measured influent sample concentrations ranged from 200.9 mg/L to 234.4 mg/L, with a mean concentration of 216.8 mg/L and SD of 15.5. The effluent concentrations ranged from 13.2 mg/L to 21.8 mg/L, with a mean concentration of 16.0 mg/L and SD of 3.4. The average background concentration was negligible. The resulting sediment removal efficiency for the indirect method was 92.6%. The adjusted influent concentrations ranged from 189.1 mg/L to 193.7 mg/L, with a mean concentration of 193.3 mg/L and SD of 1.9. The corresponding adjusted removal efficiency was 91.7%.

3. 100 mg/L

The average flow recorded for the entire test was 281.1 gpm (0.63 cfs), with a standard deviation (SD) of 0.4. The recorded temperature for the test was 75.4 degrees F. The measured influent sample concentrations ranged from 77.5 mg/L to 140.5 mg/L, with a mean concentration of 101.6 mg/L and SD of 24.4. The effluent concentrations ranged from 4.7 mg/L to 9.6 mg/L, with a mean concentration of 6.8 mg/L and SD of 2.2. The average background concentration was negligible. The resulting sediment removal efficiency for the indirect method was 93.3%. The adjusted influent concentrations ranged from 95.9 mg/L to 102.8 mg/L, with a mean concentration of 99.4 mg/L and SD of 3.2. The corresponding adjusted removal efficiency was 93.1%.

What is claimed is:

1. A separator tank, comprising:
    a container having a bottom wall, side wall, and top wall defining an internal chamber;
        an insert located inside of the internal chamber, the insert comprising:
        a weir defining an intake area between the weir and the side wall; and
        an orifice positioned within the intake area, said orifice having a vertically rounded edge connecting a larger outside diameter with a smaller inside diameter;
        an inlet conduit for introducing an influent liquid into the intake area; and
        wherein the weir is positioned such that the weir induces the influent liquid to flow in a swirling motion within the intake area.

2. The separator tank of claim 1, wherein the weir is curved to form a substantially circular intake area.

3. The separator tank of claim 1, wherein the weir is offset from the center line of the inlet conduit.

4. The separator tank of claim 1, wherein the insert further comprises a drop tube in fluid communication with the orifice and extending into the lower chamber.

5. The separator tank of claim 4, wherein the drop tube comprises at least one vertical vane to dissipate the swirling motion as the influent liquid flows through the drop tube.

6. The separator tank of claim 4, wherein the drop tube comprises a base formed by two wings for directing the influent liquid into the lower chamber.

7. An insert for a separator tank, the insert comprising:
    a weir defining an intake area for receiving an influent liquid; and
    an orifice positioned within the intake area, said orifice having a vertically rounded edge connecting a larger outside diameter with a smaller inside diameter.

8. The insert of claim 7, wherein the weir is curved to form a substantially circular intake area.

9. The insert of claim 7, wherein the insert further comprises a drop tube in fluid communication with the orifice and extending below the insert.

10. The insert of claim 9, wherein the drop tube comprises at least one vertical vane.

11. The separator tank of claim 9, wherein the drop tube comprises a base formed by two wings.

12. An insert for a separator tank, comprising:
    a weir defining an intake area for receiving an influent liquid;
    an orifice positioned within the intake area; and
    a drop tube in fluid communication with the orifice, the drop tube comprising:
        a base formed by two wings, wherein the two wines extend beyond the circumference of the drop tube.

13. The insert of claim 12, wherein the weir is curved to form a substantially circular intake area.

14. The insert of claim 12, wherein the drop tube further comprises at least one vertical vane.

15. The insert of claim 12, wherein the drop tube further comprises a back wall and front wall.

16. The insert of claim 12, wherein the two wings are angled downward.

17. An insert for a separator tank, comprising:
    a weir defining an intake area for receiving an influent liquid;
    an orifice positioned within the intake area; and
    a drop tube in fluid communication with the orifice, the drop tube comprising:
        at least two vertical vanes disposed in the drop tube, each vertical vane having a length, wherein the length of at least one of the vertical vanes differs from the length of at least one of the other vertical vanes.

18. The insert of claim 17, wherein the weir is curved to form a substantially circular intake area.

19. The insert of claim 17, wherein the drop tube comprises a base formed by two wings.

20. The insert of claim 19, wherein the drop tube further comprises a back wall and front wall.

21. An insert for a separator tank, comprising:
    a weir defining an intake area for receiving an influent liquid;
    an orifice positioned within the intake area; and
    a drop tube in fluid communication with the orifice, the drop tube comprising:
        a base formed by two wings;
        a back wall; and
        a front wall; said back wall and said front wall connecting said drop tube to said base; and wherein the arc length of said back wall is greater than the arc length of said front wall.

* * * * *